July 17, 1951  D. F. FINCHER ET AL  2,560,791
PORTABLE ARMREST FOR MOTOR VEHICLES
Filed Jan. 10, 1950
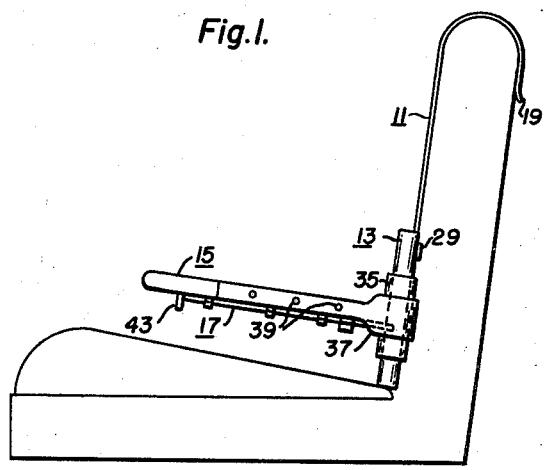
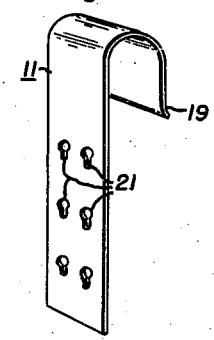
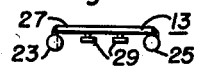
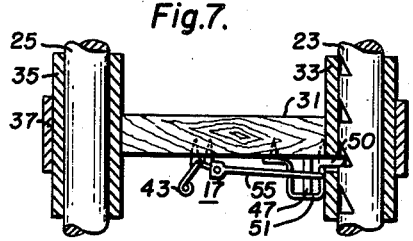
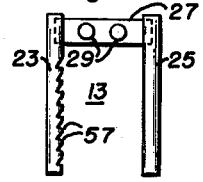
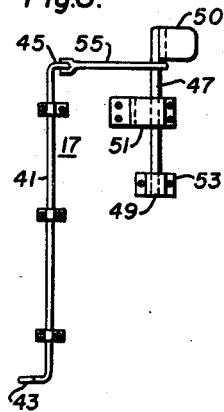
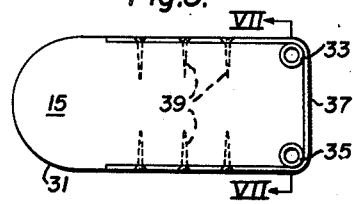
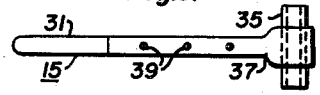
INVENTORS
DEWITT F. FINCHER &
HOYT T. FINCHER.
BY William T. Wofford
ATTORNEY Patented July 17, 1951

2,560,791

UNITED STATES PATENT OFFICE 2,560,791

PORTABLE ARMREST FOR MOTOR VEHICLES

Dewitt Fred Fincher and Hoyt Thomas Fincher, Fort Worth, Tex., assignors of one one-hundredth part to William Tatum Wofford, Pittsburgh, Pa.

Application January 10, 1950, Serial No. 137,789

8 Claims. (Cl. 155—198)

1

Our invention relates to arm rests, and more particularly to a portable, adjustable arm rest which is designed primarily for use in motor vehicles.

There is generally no provision made in a motor vehicle to rest the arm of the driver which is remote from the vehicle door nearest him. This arm of a driver, on a long trip, is therefore subjected to considerable fatigue. In seeking comfort, the driver is likely to use only one hand at a time for driving, thus lessening his control of the motor vehicle. The provision of an arm rest for the off-side arm of such a driver is highly desirable.

An arm rest, in order to be suitable for this application, must meet several requirements. It must be adapted to fit auto seats of various configurations. It must be easily adjustable, both to the particular auto seat, and to suit the fancy of the driver at his different stages of fatigue. This latter adjustment should be conveniently available to the driver while the vehicle is in motion, without jeopardizing control of the vehicle. The arm rest must be constructed so that it can be placed in a position out of the way when not in use, without the necessity of detaching it from the vehicle seat. Further the arm rest must be of simple, rugged, and economical construction. None of the arm rests of the prior art of which we are aware, meet the requisites outlined above.

It is accordingly an object of our invention to provide an improved arm rest for use in motor vehicles.

It is another object of our invention to provide an auto arm rest which is easily adjustable by the driver when the vehicle is in motion.

It is another object of our invention to provide an auto arm rest which has a position out of the way when not in use, and yet may remain in place on the auto seat ready for use.

It is a further object of our invention to provide an auto arm rest adapted to fit any conventional auto seat, and having two independent adjusting means.

It is a still further object of our invention to provide an auto arm rest which is simple, rugged, and economical in construction.

In accordance with our invention, we provide an arm rest comprising three basic parts. The first part is a support member one end of which is adapted to engage the top of the back of a motor vehicle seat. This support member has longitudinally spaced openings located in its other end for rough vertical adjustment of the arm rest. The second part is a supported member provided with means for engaging said openings. This supported member is adapted to receive the third part, which is the arm support, in slideable engagement. The arm support is

2 provided with latch means, conveniently operable by the motor vehicle driver, while the vehicle is in motion, for locking the arm support at any desired position relative to the supported member.

Further objects and advantages of our invention will be apparent from the following detailed description of a specific embodiment of our invention, when read together with the accompanying drawings in which:

Fig. 1 is a view showing a complete auto arm rest, in a specific embodiment of our invention, mounted on a typical motor vehicle seat.

Fig. 2 is a perspective view of the support member.

Figs. 3 and 4 show details of the supported member.

Figs. 5 and 6 show details of the arm support member and

Figs. 7 and 8 show details of the latch mechanism used in a specific embodiment of our invention.

With reference to the drawing, the arm rest is basically composed of a support member, a supported member, an arm support, and a latch mechanism, indicated generally, respectively at 11, 13, 15, 17. The support member 11 is made of suitable resilient strip material, preferably aluminum. The upper portion of the support member is formed generally U shaped to fit the configuration of the top of a conventional auto seat back, and exert a clamping force thereon. The extremity 19 of the support member may be flared so that the support member will slip easily over the top of the seat back. Slotted openings 21 are formed along the vertical length of the support member to afford a rough vertical adjustment of the arm support. In the embodiment shown, these openings are in horizontal pairs to lend rigidity to the mounting of the supported member. Further, these openings 21 are preferably key-shaped in order that the supported member 13 may be locked to the support member 11.

The supported member 13 comprises a pair of rods 23, 25, held in spaced parallel relation by a bar 27 suitably attached to one of their ends. Spaced knobs 29 are rigidly attached to the bar 27. These knobs 29 preferably have heads just smaller than the larger portions of the key-shaped openings 21 in the support member 11, and shanks just smaller than the smaller portions of said openings. One of said rods 23 is serrated for a purpose to be hereinafter more fully described.

The arm support member 15 may be of any desired configuration. For convenience, in the specific embodiment shown, it includes a substantially rectangular wooden member 31 having a rounded edge on one end. The other end is shaped to make a snug fit with a pair of spaced sleeves 33, 35, one of which is located at each corner. These sleeves are held in spaced parallel relation in any suitable manner, such as brazing or welding, to a strap member 37. The sleeves 33, 35 are so spaced as to slideably engage the parallel rods 23, 25 of the supported member 13. The rods, being held only at one end, are sufficiently resilient to form an easy sliding fit into said sleeves. The strap member 37 may be attached to the wooden portion of the arm rest in any suitable manner, such as by screws 39. It is to be understood that the arm support 15 can be of any suitable construction and upholstery, so long as means is provided for holding the spaced sleeves 33, 35 in a rigid parallel position to engage the rods 23, 25 of the supported member 13.

The latch mechanism 17 is located under the arm support 15 in such manner that the operating control can be conveniently manipulated by the user. We prefer to locate the operating control near the rounded end of the arm support, so as to be within natural reach of the user's fingers, when his arm is at rest on the arm support. Many suitable latch mechanisms could be devised, and we show a particular one in our specific embodiment, but we do not propose to be limited thereby. The latch mechanism 17 shown comprises a double ended crank member 41 having end portions 43, 45 the axes of which are located in planes whose line of intersection contains the axis of the crank member 41 and said planes making an acute angle which is of such magnitude that an upward and outward motion of the operating end 43 will cause a downward and outward motion of the other end 45. The crank 41 is suitably secured to the bottom of the arm support member 15, so that its axis is parallel to the length of the arm support. Also secured to the arm support in a position substantially parallel to the axis of the crank 41 and spaced therefrom, is a resilient spring member 47. This spring member is anchored at one end 49 and has a dog 50 suitably attached to its free end. A spring guide 51 may be provided between the anchor 53 and the dog. The spring 47 and dog 50 are connected to the end of the crank 41 nearest the support member, by a moveable link 55, so that the dog 50 responds laterally to movement of the crank operating end 43. The sleeve 33 of the arm support which is to engage the serrated rod 23 is slotted to permit lateral engagement of the dog 50 with the rod serrations 57. Thus, by fingertip control, the arm rest user can adjust the arm support 15 to any desired vertical position.

From the foregoing description of a specific embodiment of our invention, it will be clear that we have provided an improved arm rest which meets all of the requirements of a portable arm rest which is to be applied to a motor vehicle. We are aware that certain modifications of our invention will appear to those skilled in the art, without departing from the scope of our invention. We wish therefore to be limited only insofar as is necessitated by the prior art and the spirit of the appended claims.

We claim:

1. A portable auto arm rest, comprising a support member of resilient strip material, one end of which is adapted to clamp the top of an auto seat back, and having a plurality of longitudinally spaced openings located at intervals beginning near the opposite end, a supported member having means for engaging said openings, and an arm rest member slideably engaging said supported member.

2. A portable auto arm rest, comprising a support member of resilient strip material, one end of which is adapted to clamp the top of an auto seat back, and having a plurality of longitudinally spaced openings located at intervals beginning near the opposite end, a supported member having means for engaging said openings, an arm rest member slideably engaging said supported member, and latch means adapted to lock said arm rest member at any desired position relative to said supported member.

3. A portable auto arm rest, comprising a support member, one end of which is adapted to engage the top of an auto seat back, a supported member, means for suspending said supported member at selectable positions longitudinally of said support member, an arm rest member adjustably attached to said supported member, and latch means to lock said arm rest member at any desired position relative to said supported member.

4. A portable auto arm rest, comprising a support member, one end of which is adapted to engage the top of an auto seat back, a supported member, means for suspending said supported member from aforesaid support member, and an arm rest member adjustably attached to said supported member.

5. An arm rest, comprising a support member made of resilient strip material having one end formed suitably to clamp to a substantially vertical support, the other end having a plurality of longitudinally spaced openings therein, a supported member comprising a pair of rods, joined in spaced parallel relation by a bar at one of their ends, said bar having means thereon for engaging any one of said openings, an arm support member having parallel spaced sleeves in one end adapted to slideably engage said rods in a manner such that said arm support member is substantially at a right angle with respect to said other members, and latch means to lock said arm support member at any desired position along the length of said rods.

6. The invention in accordance with claim 5, wherein said latch means is located on the lower side of said arm support member, and a latch operating means is located near the end of said arm support member remote from said sleeves.

7. The invention in accordance with claim 5 wherein one of said rods is serrated, and said latch means includes a resiliently supported dog for engaging said serrations.

8. A portable auto arm rest, comprising a support member, one end of which is adapted to engage the top of an auto seat back, a supported member, means for attaching said supported member to the aforesaid support member, an arm rest member, and means for adjustably attaching said arm rest member to said supported member.

DEWITT FRED FINCHER.
HOYT THOMAS FINCHER.

REFERENCES CITED

The following references are of record in the file of this patent:

UNITED STATES PATENTS

| Number | Name | Date |
|---|---|---|
| 560,547 | Shotwell | May 19, 1896 |
| 2,256,944 | Fall | Sept. 23, 1941 |
| 2,475,962 | Horn | July 12, 1949 |